Jan. 21, 1969   M. E. HINES   3,423,699
DIGITAL ELECTRIC WAVE PHASE SHIFTERS
Filed April 10, 1967   Sheet _1_ of 6

Marion E. Hines
Inventor
by Alfred ......
Attorney

Marion E. Hines
Inventor
by Alfred H. Rosen
Attorney

United States Patent Office 3,423,699
Patented Jan. 21, 1969

3,423,699
DIGITAL ELECTRIC WAVE PHASE SHIFTERS
Marion E. Hines, Weston, Mass., assignor to Microwave Associates, Inc., Burlington, Mass., a corporation of Massachusetts
Filed Apr. 10, 1967, Ser. No. 629,796
U.S. Cl. 333—31                                11 Claims
Int. Cl. H03h 7/18

ABSTRACT OF THE DISCLOSURE

Digital phase shifters of the reflection type are described in which the reflection coefficient can be given any one of four discrete phase values separated electrically by 90 degrees, or π/2 radians, using only two switchable admittances or impedances; semiconductor diodes (e.g.: PIN type) which are switchable from one state to another by an applied voltage, are used as switch devices, or as the switchable admittance or reactance when inherent reactance components are made part of the circuit. Combinations of these four-state phase shifters with other phase shifters providing additional phase-shift in increments of 22.5 degrees and 45 degrees, using two or four additional switch devices, are shown to provide a phase shifter system which affords any one of sixteen different reflection coefficient phase angles spaced uniformly around the Smith Chart circle, using in one case a total of four switch devices with a circulator, and in another case a total of six switch devices with no circulator.

BACKGROUND OF THE INVENTION

Field of the invention

The present invention relates to the improvement and simplification of electric wave phase shifters, of the quantized, digital, or discrete type in which the phase of an alternating-current wave may be altered in discrete steps, and more particularly of the reflective type in which an incident wave propagating along a transmission path is reflected with a selected one of a plurality of possible discrete phase shifts or delays.

The invention is directed in one important general aspect to techniques for achieving phase changes in 90 electrical degree increments accurately to provide large increments of phase change. To this end, the invention proposes an electric wave phase shifter for imparting to a wave reflected along a transmission path any one of four phase states spaced substantially at ninety electrical degree intervals; the phase shifter comprises a transmission path for incident and reflected waves, wave reflective means in the path including a first and a second switchable impedance means, the first switchable impedance means having a first and a second impedance states and the second switchable impedance means having a third and a fourth impedance states, the first switchable impedance means providing substantially 180 electrical degrees of phase shift to said reflected wave when switched between its first and second impedance states and the second switchable impedance means providing substantially ninety electrical degrees of phase shift when switched from its third to its fourth impedance states, the phase shifts resulting from the switching of either of said switchable impedance means being independent of the impedance state of the other of said switchable impedance means.

For phase shifts in finer increments, it is possible electrically to add to or insert between the larger increments smaller pre-set increments of phase change. To accomplish this, a transmission type phase shifter may be inserted in the transmission path between the source of the signal and the reflective phase shifter. The invention contemplates techniques and combinations for accomplishing these results.

Electric wave phase shifters are useful in electronic circuits and systems of many types, one type of application being the control of the phase of waves in radio or RADAR antennas to control the direction of reception or radiation of electromagnetic energy. Systems of this type are described, for example, in my U.S. Patent No. 3,238,-528.

Description of the prior art

Figure 1:
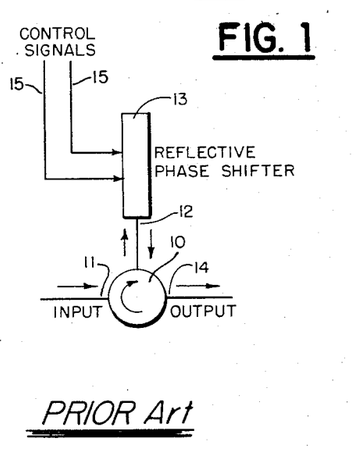
FIGS. 1–4 show prior art systems using reflection-type phase shifters which are described in the foregoing description of the prior art.
Figure 2:
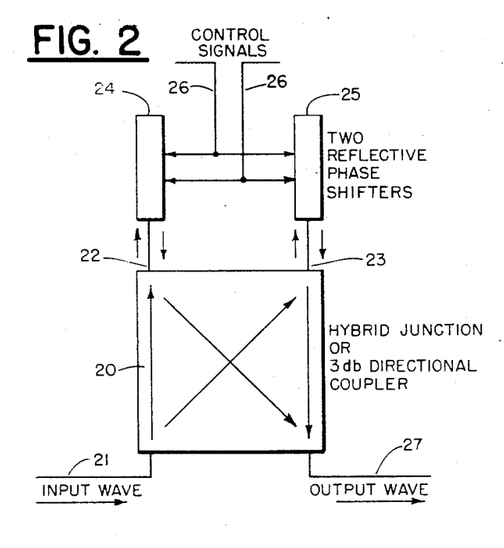
Figure 3:
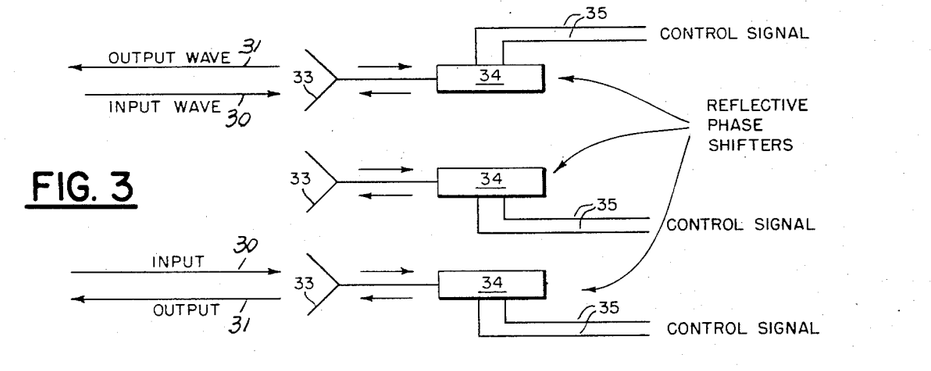

Several known methods of using reflective phase shifters are illustrated in FIGS. 1–3 of the accompanying drawings. FIG. 1 shows the use of a circulator 10 to convert the reflective type phase shifter into the more generally useful transmission type device. The input wave on transmission line 11 is diverted by the circulator to the upper arm 12. The wave is reflected from the reflective phase shifter 13 with a variable phase shift or delay and then diverted again by the circulator to the output line 14. Control of the reflection coefficient in the reflective phase shifter 13 is achieved by control signals over control lines 15, and changes the phase of the reflected wave and the output wave when compared with the incident wave.

FIG. 2 shows an alternative method of accomplishing this conversion. A hybrid junction or 3 db. direction coupler 20 divides the input wave from line 21 into two equal parts and transmits the divided waves over lines 22 and 23 to two similar reflective phase shifters 24 and 25, respectively. As in FIG. 1, the reflected waves may be altered in phase by control signals applied over control lines 26 to the two phase shifters simultaneously. The reflected waves will recombine in the hybrid junction 20 and emerge from the hybrid junction output line 27 with a phase shift corresponding to that of the reflective phase shifters.

FIG. 3 shows the application of a plurality of reflective phase shifters in a phased array antenna of the reflective or "reflectarray" type. A wave in space (input wave 30) transmitted from a more remote source (not shown) impinges on all of the antenna elements 33, then is transmitted to respective reflective phase shifters 34, where reflection occurs. The waves are then reradiated as output waves 31 from the several antenna elements 33. If the phase shifts of the various phase shifters 34 are controlled, as by control signals over control lines 35, according to a predetermined but controllable pattern, the reflected waves will recombine in space with a new direction of maximum radiation intensity which direction is controllable through the settings of the various phase shifters. The techniques for doing this are now known in the art.

Figure 4:
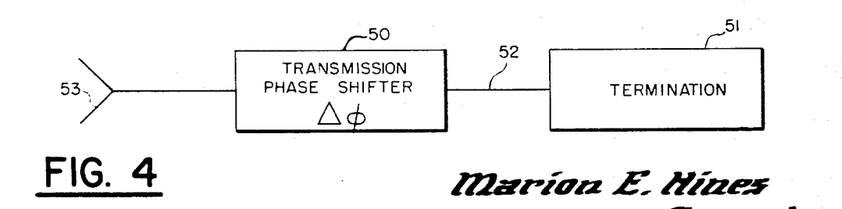

FIG. 4 illustrates a known way to use a reciprocal type of transmission phase shifter 50 in a reflective phase shifter system. The termination 51 at the end of the transmission path 52 is made reflective, as by being an open or a short-circuit for the path. Then the total phase change is 2Δφ+0° or 180°, depending upon whether the termination 51 is an open circuit or a short circuit, respectively. In FIG. 4, the signal wave input and output member is shown as an antenna member 53, but this is exemplary only.

SUMMARY OF THE INVENTION

The present invention relates to new techniques of design of reflective phase shifters for use in these and other applications, and more particularly to techniques which are digital or discrete in nature, providing a plurality of alternative phase shift values. Control of the phase shift may be accomplished by the use of semiconductor diodes, variable impedance elements, ferrite variable impedance elements, or other electronic devices capable of giving discrete changes in an alternating current impedance. It is a general object of the invention to provide electric wave phase shifters to give phase control in equally spaced angular intervals over a complete 360° range of phase shift. Binary digital control is provided so that the control signal may be applied through $n$ input leads and each lead may have either one of two possible applied voltages or currents. With $n$ such control inputs, $2^n$ phase states are obtainable, equally spaced in angle around a full 360° circle. If $n=1$, then a phase shift of 0° or 180° is involved. For $n=2$, phase shifts of 0°, 90°, 180°, 270°, are obtainable; for $n=3$, the invention makes it possible to obtain phase shifts of 0°, 45°, 90°, 135°, 180°, 225°, 270°, 315°, etc. This technique is useful in controlling phase shifters in phased array antennas and other applications.

A particular feature of the invention is that it permits such equally-spaced angular control for $n=2$ requiring only two variable impedance elements (such as semiconductor diodes). Another feature of the invention is that it also permits the design of reflective phase shifters of finer control capability ($n=4$, 5, 6, or more) with a minimum number of diodes, and requires at most only one hybrid junction or circulator for such applications; whereas prior digital phase shifters having this purpose required one hybrid or circulator for each "bit" of control (i.e.: for $n=5$, five hybrids or circulators were needed).

A fundamental phase shifter of the invention, which permits such equally-spaced angular control for $n=2$ is a reflection-type phase shifter including two switchable impedance means each having two alternative impedance states, the first providing substantially 180° of phase shift to a reflected wave when switched between its states, and the second providing 90° of phase shift when switched. The phase shift provided by one is independent of the impedance state of the other.

DESCRIPTION OF EMBODIMENTS
OF THE INVENTION

Figure 5:
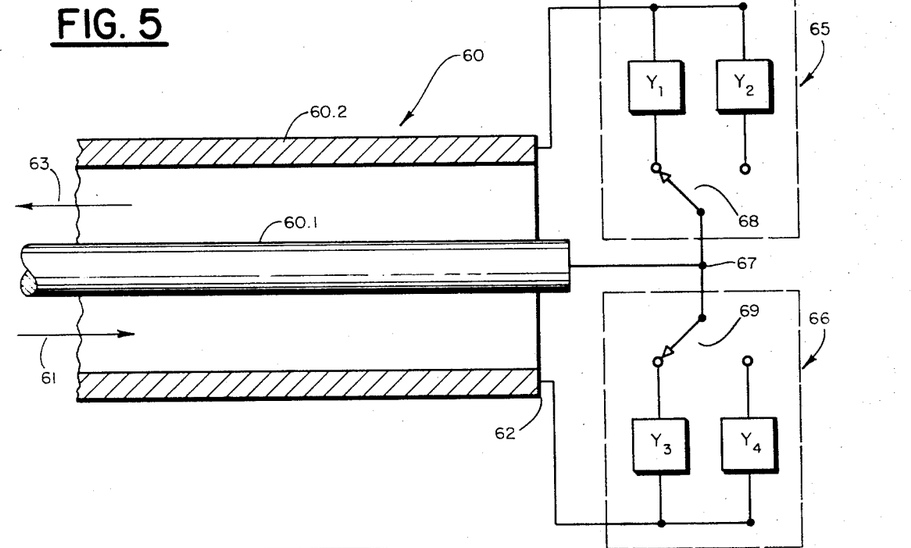
FIG. 5 schematically illustrates an embodiment of the invention for obtaining four phase states spaced 90 electrical degrees apart using two switch devices.

FIG. 5 illustrates a digital phase shifter of the reflection type comprising a section of transmission line 60 (here shown as a coaxial line comprising an inner conductor 60.1 and an outer conductor 60.2—other types may be acceptable). An incident wave 61 travels to the right and is reflected at the right-hand end 62, ideally with zero losses. The reflected wave 63 undergoes a phase shift, compared with the incident wave 61, which depends upon the impedance or admittance terminating the line at the right-hand end 62, at a reference point 67. The reflection point is taken as the point 67, and two terminating admittances shown respectively in each of the dashed-boxes 65 and 66, may be connected in shunt across the line at that point, as shown, through switching devices 68 and 69, respectively. Switchable admittances $Y_1$ and $Y_2$; and $Y_3$ and $Y_4$ are in boxes 65 and 66, respectively, such that the admittance of one box 65 can have alternatively one of the values $Y_1$ or $Y_2$, and the admittance of the other box 66 may have alternatively the value $Y_3$ or $Y_4$. As seen at the reference point 67, the total admittance terminating the line may have any one of four alternative values $Y_a$, $Y_b$, $Y_c$, or $Y_d$, using all combinations of switching allowed:

$$Y_a = Y_1 + Y_3 \quad (1)$$

$$Y_b = Y_1 + Y_4 \quad (2)$$

$$Y_c = Y_2 + Y_3 \quad (3)$$

$$Y_d = Y_2 + Y_4 \quad (4)$$

The phase shift obtained is determined by the reflection coefficient $\Gamma$ at the reference point 67. Using well known transmission line relationships, $\Gamma$ is determined by the relationship $$\Gamma = \frac{Y_o - Y}{Y_o + Y} \quad (5)$$

where $Y_o$ is the characteristic admittance of the transmission line ($Y_o$ is the inverse of the characteristic impedance $Z_o$), and $Y$ is the total admittance terminating the line. In the present example, $Y$ may have any one of the four values $Y_a$, $Y_b$, $Y_c$ and $Y_d$.

The phase shift is the argument or phase angle of the reflection coefficient $\Gamma$. Thus, if $\Gamma$ is written in exponential form, $$\Gamma = ae^{-j\theta} \quad (6)$$

$\theta$ is the phase shift of the reflected wave compared with the incident wave and $a$ is the magnitude of the reflection coefficient so that the ratio of the reflected power to the incident power is equal to $a^2$. Ideally, $a$ approaches unity for a lossless phase shifter. The value of $a$ will be unity if each of the admittances $Y_a$, $Y_b$, $Y_c$ and $Y_d$ is purely reactive or is equal to zero or infinity. It is assumed that this is the case of the present discussion.

If it is desired to provide a choice of any one of four discrete values $\Gamma_a$, $\Gamma_b$, $\Gamma_c$, and $\Gamma_d$, the following relationships may be derived from Equations 1 through 5, giving the admittance value required:

$$Y_1 + Y_3 = \frac{1 - \Gamma_a}{1 + \Gamma_a} \quad (7)$$

$$Y_1 + Y_4 = \frac{1 - \Gamma_b}{1 + \Gamma_b} \quad (8)$$

$$Y_2 + Y_3 = \frac{1 - \Gamma_c}{1 + \Gamma_c} \quad (9)$$

$$Y_2 + Y_4 = \frac{1 - \Gamma_d}{1 + \Gamma_d} \quad (10)$$

These equations are not completely independent and some further restrictions on allowed values of $\Gamma$ are necessary if they are not to be inconsistent.

For a four-state digital phase shifter, it is normally required that the four phase states be separated electrically by 90°, or $\pi/2$ radians, in order to approximate any arbitrary desired value with minimum possible error. Thus, the relationship among the $\Gamma$'s should be restricted to either:

$$\Gamma_b = j\Gamma_a \quad (11)$$

$$\Gamma_c = -\Gamma_a \quad (12)$$

or:

$$\Gamma_d = -j\Gamma_a \quad (13)$$
$$\Gamma_b = -j\Gamma_a \quad (14)$$
$$\Gamma_c = -\Gamma_a \quad (15)$$
$$\Gamma_d = +j\Gamma_a \quad (16)$$

If now these values are substituted into (7), (8), (9), and (10), and the equations are tested for consistency, one finds that the equations can be simultaneously satisfied only if $\Gamma_a$, at the reference point 67, has one of the four values specified by:

$$\Gamma_a = \pm\sqrt{\pm j} \quad (17)$$

and it follows that the values of $\Gamma_b$, $\Gamma_c$, and $\Gamma_d$ also must satisfy (17). This relationship (17) applies at the reference point 67, the point of branching. Thus to obtain a phase shifter for four states spaced 90° apart, electrically, using two substantially lossless switchable admittances as shown in FIG. 5, values of the reflection coefficient should be so restricted that $\theta$ will take on the values 45°, 135°, −45°, and −135° (relative to 0° as a reference) but not necessarily in that order.

It is possible to choose several sets of Γ's to satisfy these relationships. One suitable set is given below, as follows:

Let:

$$\Gamma_a = \frac{1+j}{\sqrt{2}} = +\sqrt{+j} \quad (18)$$

$$\Gamma_b = \frac{-1+j}{\sqrt{2}} = -\sqrt{-j} \quad (19)$$

$$\Gamma_c = \frac{-1-j}{\sqrt{2}} = -\sqrt{+j} \quad (20)$$

$$\Gamma_d = \frac{1-j}{\sqrt{2}} = +\sqrt{-j} \quad (21)$$

Solving Equations 1 to 4, respectively, for $Y_a$, $Y_b$, $Y_c$, $Y_d$, obtain $$Y_a = -j\frac{\sqrt{2}}{2+\sqrt{2}}Y_o = Y_1 + Y_3 \quad (22)$$

$$Y_b = -j\frac{\sqrt{2}}{2-\sqrt{2}}Y_o = Y_1 + Y_4 \quad (23)$$

$$Y_c = +j\frac{\sqrt{2}}{2-\sqrt{2}}Y_o = Y_2 + Y_3 \quad (24)$$

$$Y_d = +j\frac{\sqrt{2}}{2+\sqrt{2}}Y_o = Y_2 + Y_4 \quad (25)$$

These equations are not yet sufficiently definitive to determine uniquely $Y_1$, $Y_2$, $Y_3$, and $Y_4$, although they do specify necessary relationships among them. If desired, one may choose, as a designer's option, one additional relationship within broad restrictions. For example, if one sets $Y_3 = 0$ (open circuit), the following consistent and useful set of admittances is obtained:

$$Y_1 = -j\frac{\sqrt{2}}{2+\sqrt{2}}Y_o = -j(\sqrt{2}-1)Y_o \quad (26)$$

$$Y_2 = +j\frac{\sqrt{2}}{2-\sqrt{2}}Y_o = +j(\sqrt{2}+1)Y_o \quad (27)$$

$$Y_3 = 0 \quad (28)$$

$$Y_4 = -2Y_o \quad (29)$$

Other permutations and orders of reflectances are possible within the scope of this invention. For example, another alternative might be to set $Y_4 = 0$. Still another alternative could involve another type of relationship, such as $Y_1 = -Y_2$, yielding still another useful set of admittances, as follows:

$$Y_1 = -j\sqrt{2Y_o} \quad (30)$$
$$Y_2 = +j\sqrt{2Y_o} \quad (31)$$
$$Y_3 = +jY_o \quad (32)$$
$$Y_4 = -jY_o \quad (33)$$

Thus, there is provided a procedure for determining, in a phase shifter according to FIG. 5, the values of the admittances permissible for $Y_1$, $Y_2$, $Y_3$, and $Y_4$ with a wide degree of flexibility. This procedure involves the recognition that the four reflection coefficients $\Gamma_a$, $\Gamma_b$, $\Gamma_c$, and $\Gamma_d$ must fit the values given in Equations 18, 19, 20, and 21, respectively, for a four-state phase shifter using two switchable admittances and that the admittances $Y_a$, $Y_b$, $Y_c$ and $Y_d$ must satisfy Equations 22, 23, 24, and 25, respectively. These equations specify the interrelationships between admittances, but the order of selection of values to use for the various states may be permuted among the equations by one skilled in the art. Certain flexibilities are possible in choosing the actual values provided these Equations 18–21; 22–25 are satisfied. Two sets of appropriate admittance values are given as examples in Equations 26–29 and Equations 30–33. Others are also possible and may be easily derived from Equations 22–25 by one skilled in the art.

The foregoing discussion in connection with FIG. 5 shows how to design a digital reflection type phase shifter to give any one of four phase states spaced at 90° intervals using two switchable impedance networks 65 and 66 as control elements when coupled to a transmission line 60. In practice, it is possible to use a single variable impedance device such as a semiconductor diode for each of these networks, so that four phase states may be obtained with only two diodes whose impedances can be discretely changed by discrete variation of the bias voltages applied.

Figure 6:
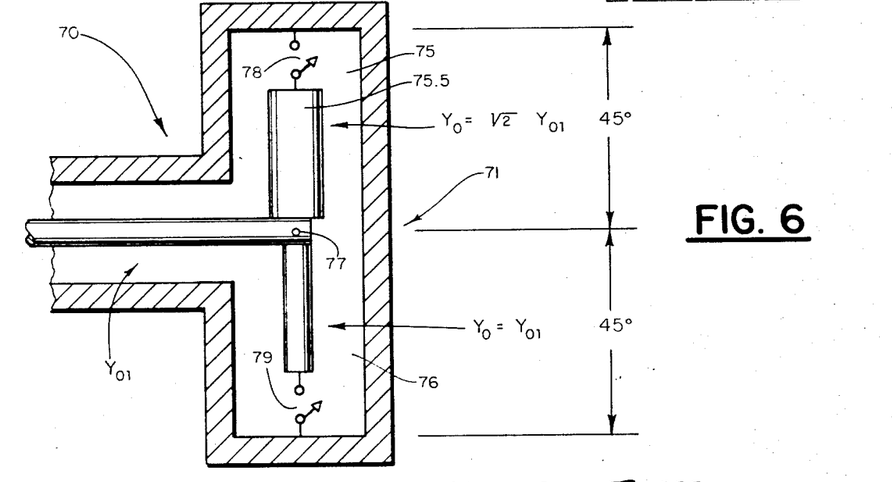
FIG. 6 illustrates partly schematically the structure of a phase shifter according to FIG. 5.

FIG. 6 illustrates an embodiment of the invention according to FIG. 5, using semiconductor diodes such as the PIN RF switching diode for the switching devices 68 and 69. This illustration is idealized by assuming that each diode acts as in ideal switch, providing either an open circuit (very high impedance, as in reverse bias) or a short circuit (very low impedance as in forward bias). A coaxial line 70 has at one end a T section 71 with two short lengths 75 and 76 connected in parallel to a common junction point 77, and terminated in ideal switches 78 and 79. The reference point for determination of the reflection coefficient is taken at the junction point 71. Each short length 75, 76 is a stub which acts as a switchable admittance seen at the reference point 77, and the two stubs are electrically in parallel or shunt configuration. If each stub is a line section which is electrically 45° long, the admittance seen at the junction point 77 will have the value $-jY_o$ when the switch (diode) acts as a short circuit, and a value $+jY_o$ when the switch (diode) is an open circuit. One stub line 76 has the same characteristic admittance as the input line, namely $Y_{01}$, and the other stub line 75 has a higher characteristic admittance, namely $\sqrt{2Y_{01}}$, by making the center conductor 75.5 thicker, given $\pm j\sqrt{2Y_{01}}$ as the admittance in the two states. The higher admittance stub line 75 and its associated switch 78 is the "first" switchable admittance, giving values $Y_1 = -j\sqrt{2Y_{01}}$ and $Y_2 = +j\sqrt{2Y_{01}}$. The other stub line 76 has switchable admittance values $Y_3 = +jY_{01}$ (for open circuit) and $Y_4 = -jY_{01}$ (for short circuit). These are the conditions specified in Equations 30, 31, 32 and 33.

Figure 7:
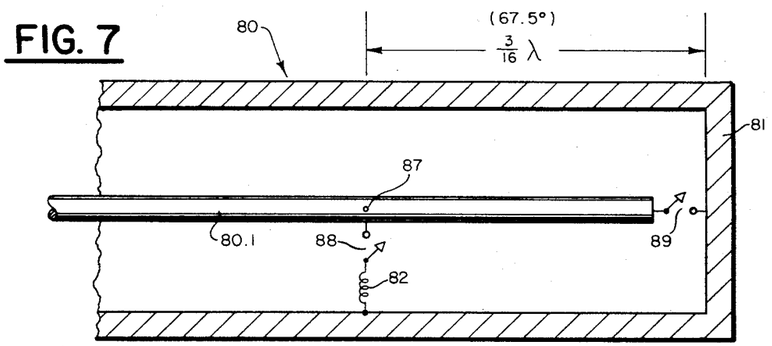
FIG. 7 illustrates partly schematically the structure of another phase shifter according to FIG. 5.

FIG. 7 illustrates an embodiment of the invention for obtaining the admittance values for Equations 26, 27, 28, and 29. Here the reference point 87 is 3/16 wavelength from one end 81 of the coaxial line 80. At the reference point 87 an inductor 82 in series with a switch 88, is tapped across the line. The end 81 of the line 80 is short circuited, and the center conductor 80.1 is connected to it by a second switching device 89. The line between the reference point 87 and the end 81 has two values of effective admittance seen at the reference point:

$$Y_1 = -j\frac{\sqrt{2}}{2+\sqrt{2}}Y_o \quad \text{switch 89 (open circuit)}$$

$$Y_2 = +j\frac{\sqrt{2}}{2-\sqrt{2}}Y_o \quad \text{switch 89 (short circuit)}$$

The admittance of the inductor 82 is $$-j\frac{1}{\omega L}$$

when the associated switch 88 is a short circuit, and zero when the switch 88 is an open circuit. With a proper choice of inductance, for the frequency of operation, the admittances of this branch (82, 88) are:

$$Y_3 = 0$$

$$Y_4 = -j2Y_o$$

$$(\omega L = 2/Y_o)$$

These are the conditions specified in Equations 26, 27, 28, and 29.

Figure 8:
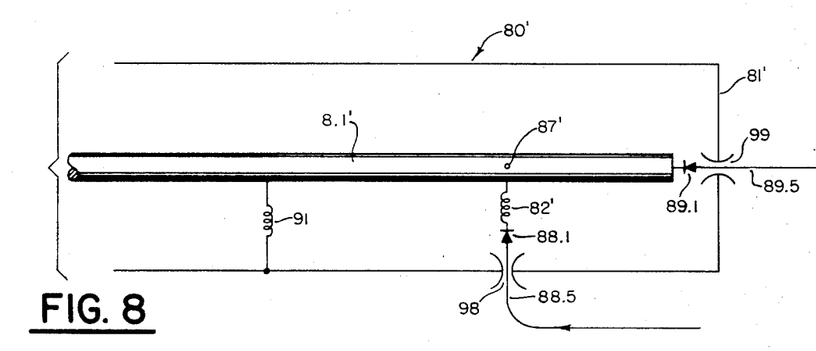
FIG. 8 illustrates the structure of a phase shifter according to FIG. 7 using switchable diodes with $n=2$ bias control leads.

Practical diodes require suitable RF by-pass elements and DC returns which can be provided by one skilled in the art. FIG. 8 which is the same embodiment as FIG. 7, shows one technique for accomplishing this aim. Parts common to both figures bear the same reference characters primed. A semiconductor diode 88.1 is used as the switch 88, with one electrode 88.5 brought out through a by-pass capacitor 98 to a source of bias voltage (not shown). A semiconductor diode 89.1 is used as the switch 89, with one electrode 89.5 brought out through the by-pass capacitor 99 in the end wall 81 to a source of bias voltage (not shown). The RF 91 choke provides the DC return path for forward bias current.

Practical semiconductor diodes have an inherent small inductive reactance when forward biased and retain a small capacitive susceptance when in reverse bias. These are perturbing effects which must be "tuned out" at the highest RF frequencies. Again, one skilled in the art can make the necessary modifications of the networks to correct for these parasitic perturbing effects within the scope of this invention.

The systems of FIGS. 5–8 incorporate two shunt admittance located in a wave transmission path, branched at a common point 67, 77 or 87. The invention can be practiced also in a system incorporating two impedances in series, as is illustrated by way of example in FIG. 9. A section of transmission line 90 comprising an inner conductor 90.1 and an outer conductor 90.2 has a shorting member 91 at one end, for reflection of an incident wave 92 entering at the other end. The reflection point is taken as the point 97 on the inner conductor 90.1, between which and the shorting member 91 two impedance assemblies 95 and 96 are connectible in series via switching devices 98 and 99, respectively. The first impedance assembly comprises first and second two-terminal impedances $Z_1$ and $Z_2$ which are alternatively selectable by the first switch device 98. The second impedance assembly comprises third and fourth two terminal impedances $Z_3$ and $Z_4$ which are alternatively selectable by the second switch device 99. The four impedances are interconnected at one terminal of each.

Referring to Equation 5, an alternative definition of the reflection coefficient $\Gamma$ involves impedances, where $$\Gamma = \frac{Z - Z_o}{Z + Z_o} \tag{5.1}$$

Equations identical in principle to those derived above can be derived to express the corresponding relationships, starting with:

$$Z_a = Z_1 + Z_3 \tag{1.1}$$

$$Z_b = Z_1 + Z_4 \tag{2.1}$$

$$Z_c = Z_2 + Z_3 \tag{3.1}$$

$$Z_d = Z_2 + Z_4 \tag{4.1}$$

From these Equations 1.1–5.1 an analogous set for $Z_1$ to $Z_4$ can be derived corresponding to Equations 22 to 25, inclusive, following the technique used above to derive these latter equations from Equations 1 to 5, inclusive.

The systems of FIGS. 5–8, and 9, allow a ninety-degree four-state digital phase shifter with only two switching devices. The present invention greatly simplifies the network requirements for four-bit phase control in reflective phase shifters. FIG. 10 illustrates one embodiment employing four switching devices and a three-port circulator. This figure is schematic, and it will be understood that the transmission lines may be in waveguide, coaxial line, strip transmission line, or otherwise, as desired.

In FIG. 10, block 100 represents a 90-degree four-state digital reflective phase shifter using two switching devices, according to the invention as illustrated, for example in any one of FIGS. 5–8, or 9. An incident wave 101 travels to the right from the input terminal 103 (which might be an antenna member) and is diverted by the circulator 104 into the upper arm 105 to the reflective phase shifter 100. The reflected wave 106 is diverted by the circulator into the lower arm 107, which is terminated by a second phase shifter 108 comprised of two branch networks 111 and 112 connected in parallel to a common branching point 109. The second phase shifter uses two switch devices 113 and 114, one in each branch network 111 and 112, respectively, to provide a choice among four distinct phase states, spaced in this example at intervals of 22.5 electrical degrees. The first branch network 111 comprises a first capacitor 111.5 and a first inductor 111.6 in series, the first switch device 113 being in parallel with the first capacitor. The second branch network comprises a second capacitor 112.5 and a second inductor 112.6 in series, the second switch device 114 being in parallel with the second capacitor. If now the parameters $jx_c$ and $jx_d$ be chosen so that $$jx_c = j5Z_o$$

$$jx_d = j10Z_o$$

where $Z_o$ is the characteristic impedance of the line 107, then the terminating admittance of the lower arm 107 as seen at the common branching point 109 may assume any one of four values, using all possible combinations of the switch devices 113 and 114, as follows:

$$jB = -j.3Y_o$$

$$jB = -j.1Y_o$$

$$jB = +j.1Y_o$$

$$jB = +j.3Y_o$$

These values of admittance yield four values of reflection coefficient which are spaced at intervals of 22.5 electrical degrees. The wave 116 after reflection in the second phase shifter 108 passes again through the circulator 104 and to the input terminal 103, with a total phase shift which is the sum of the phase shifts imposed by the two phase shifters 100 and 108.

Figure 11A:
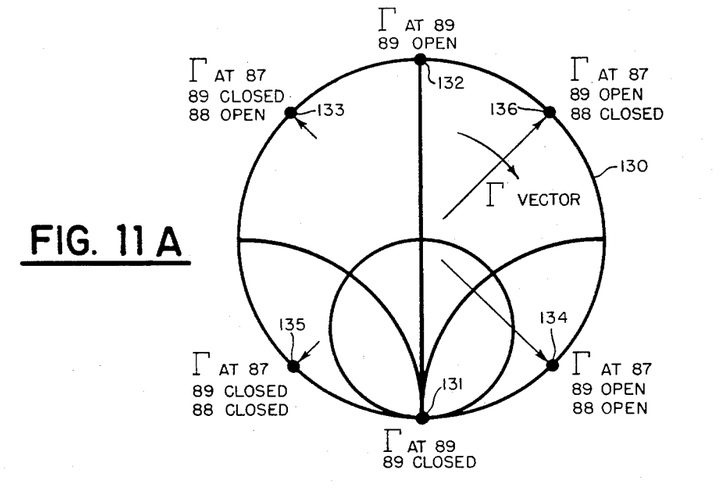
FIGS. 11A, B and C are Smith Chart illustrations for explaining the behavior of phase shifters and phase shifter systems of the invention.

The operation of the invention may be considered with the aid of Smith Charts, as is illustrated in FIGS. 11A, B and C. FIG. 11A relates to the ninety-degree four-state digital phase shifter 100, as exempliled in FIG. 7. Consider first the reflection coefficient at switch 89; when switch 89 is closed, the admittance is infinite, giving a voltage reflection coefficient $\Gamma = -1$, represented by the point 131 at the bottom of the chart. When switch 89 is open, Γ is +1, represented by the point 132 at the top of the chart. Now, move down the line 80 a distance ³⁄₁₆ wavelength, to point 87; this rotates these points 131 and 132 clockwise ³⁄₈ of the circle to points 133 and 134, respectively, if switch 88 is open. If switch 88 is closed, and if (as in FIG. 7) the susceptance of the inductor 82 is approximately $j2Y_o$, this susceptance is added to that of the line 80, giving two new locations 135 and 136 for the points 131 and 132, respectively. Careful plotting on the Smith Chart (FIG. 11A) reveals that these four points at reference point 87 are spaced at 90 degree intervals around the circle 130, meaning that, with two switch devices, the first phase shifter can provide any one of four different reflection coefficient phase angles, equally spaced around the circle 130.

Figure 11B:
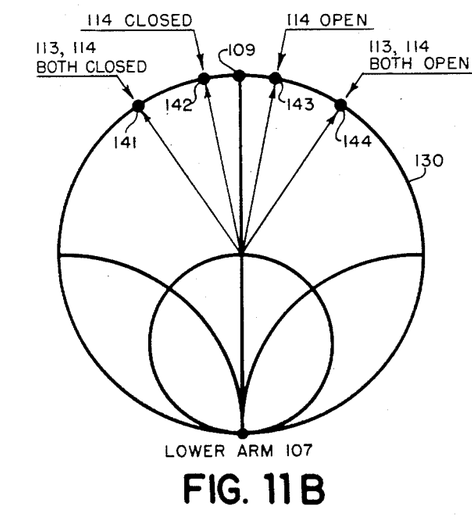

FIG. 11B illustrates the four possible values of the reflection coefficient of the second phase shifter 108, as seen at the common branching point 109 in the lower arm line 107. These values are represented by a set of points 141, 142, 143 and 144 on the circle 130, spaced at 22.5 degree intervals about the branching point 109.

Figure 10:
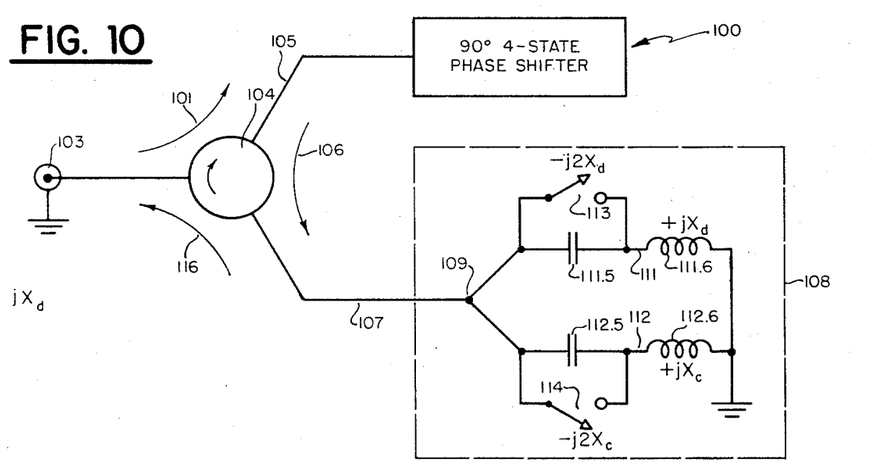
FIG. 10 shows a phase shifter system for finer (four-bit) incremental phase shift control, using four switch devices and a circulator, to provide a choice among 16 phase states spaced 22.5 electrical degrees apart.
Figure 11C:
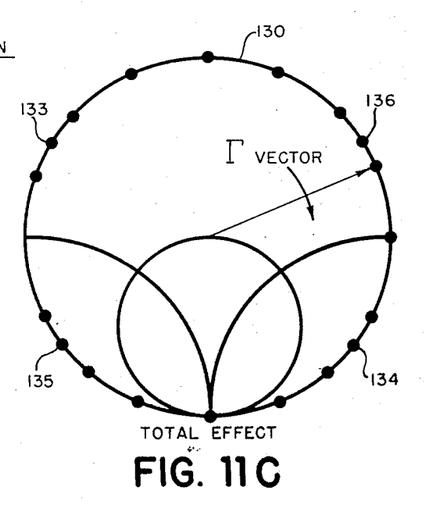

As is noted above, the wave, after reflection in the lower arm 107, passes again through the circulator 104 to the input 103. The angles of the reflection coefficient for the two arms 105 and 107 are additional, giving sixteen possible phase states equally spaced around the circle 130, as shown in FIG. 11C. The points representing these sixteen phase states are located in FIG. 11C by locating four points, corresponding to points 141–144 in FIG. 11B, about each of the points 133–136 representing the four possible phase states of the first phase shifter, in the same relative relationship that points 141–144 bear to point 109 in FIG. 11B. Selection of a desired one out of the sixteen possible phase states in the system of FIG. 10 is accomplished by a binary selection of the sixteen possible combinations achievable with only four switches—88, 89, 113 and 114.

Figure 12:
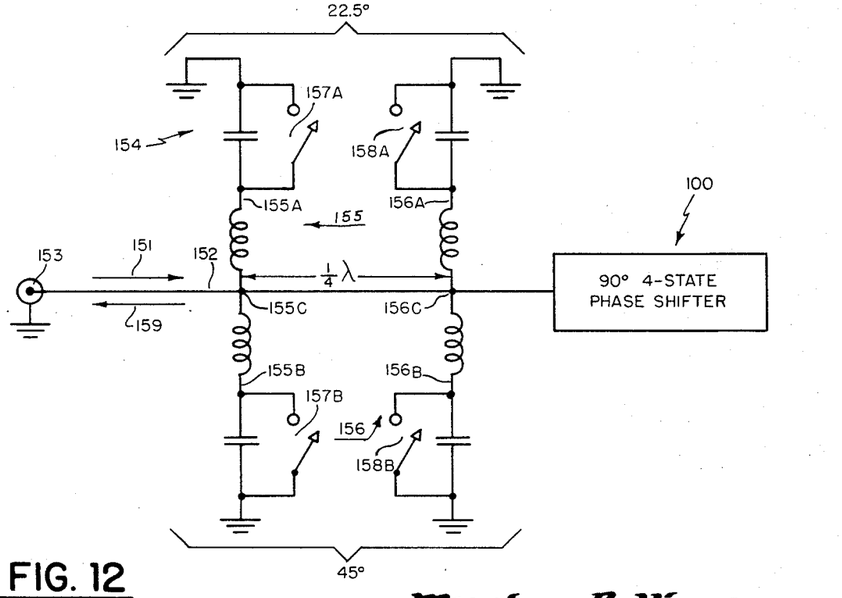
FIG. 12 shows another phase shifter system for four-bit incremental phase shift control, using six switch elements and no circulator, to provide a choice among 16 phase states spaced 22.5 electrical degrees apart.

For integrated circuit phase shifters, in which the use of a circulator may be undesirable, the use of two additional switching devices permits the circulator to be eliminated, as shown for example in FIG. 12. A transmission path represented by a line 152 has an input terminal 153 (which may be an antenna) at one end, and has its other end terminated by a 90 degree, four state reflection type phase shifter, such as represented by the block 100, as in FIG. 10. A transmission line type phase shifter 154 is located in the path 152 between the input 153 and the reflection phase shifter 100. The former phase shifter comprises two sections 155 and 156 spaced λ/4 apart in the transmission path. The first section 155 is composed of two shunt branches 155A and 155B connected to the path at a common point 155C. The second section is composed of two shunt branches 156A and 156B connected to the path at a common point 156C. Each shunt branch is schematically represented by an inductor in series with a capacitor, and a switch 157A, 157B, 158A or 158B in parallel with the capacitor. In some applications, these electrical components of a branch can be embodied in a switchable semiconductor diode, such as a PIN diode. Each switch device can be regarded as optionally open or closed.

An incident wave 151 at the input 153 travels to the rigth in the transmission path 152, first encountering the transmission line type phase shifter 154, in which the first pair of shunt branches 155A and 156A, spaced λ/4 apart, are designed to provide 11.25 degrees phase shift when their two switch devices 157A and 158A, respectively, change state. The second pair of shunt branches 155B and 156B are designed to provide 22.5 degrees phase change for a change in state of their respective switch devices 157B and 158B. The wave 151 passes twice through the sections of the transmission phase shifter 154, once before reflection from the reflection phase shifter 100, and once after reflection as the reflected wave 159. The total phase shift in the transmission phase shifter can therefore be 22.5 degrees or 45 degrees, optionally. This total phase shift is added to any one of the four 90° interval phase shifts possible with the reflection phase shifter 100. Thus with six simple shunt switching networks spaced along a single transmission line it is possible, according to the invention, to obtain any desired one of sixteen phase states, spaced 22.5 degrees apart electrically, under four-bit binary digit control.

Figure 9:
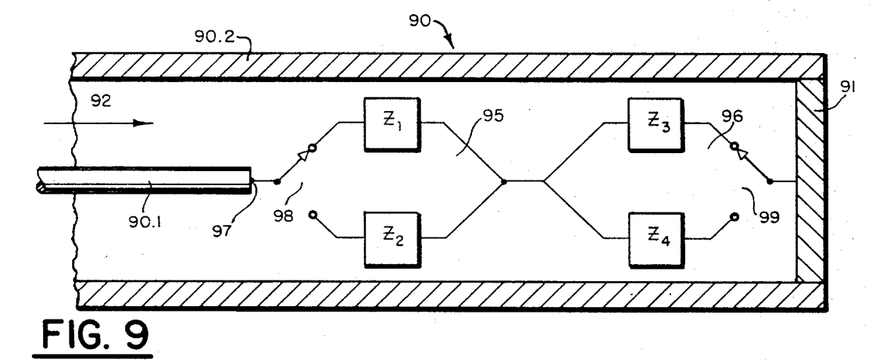
FIG. 9 schematically illustrates another embodiment of the invention for obtaining four phase states spaced 90 electrical degrees apart using two switch devices.
Figure 13:
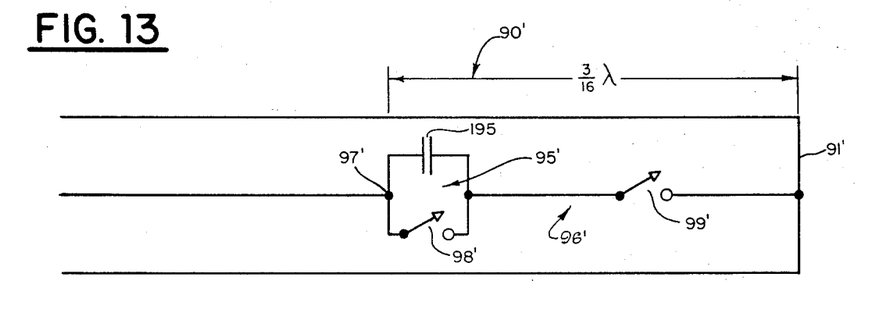
FIG. 13 schematically illustrates the construction of a phase shifter according to FIG. 9.
Figure 13A:
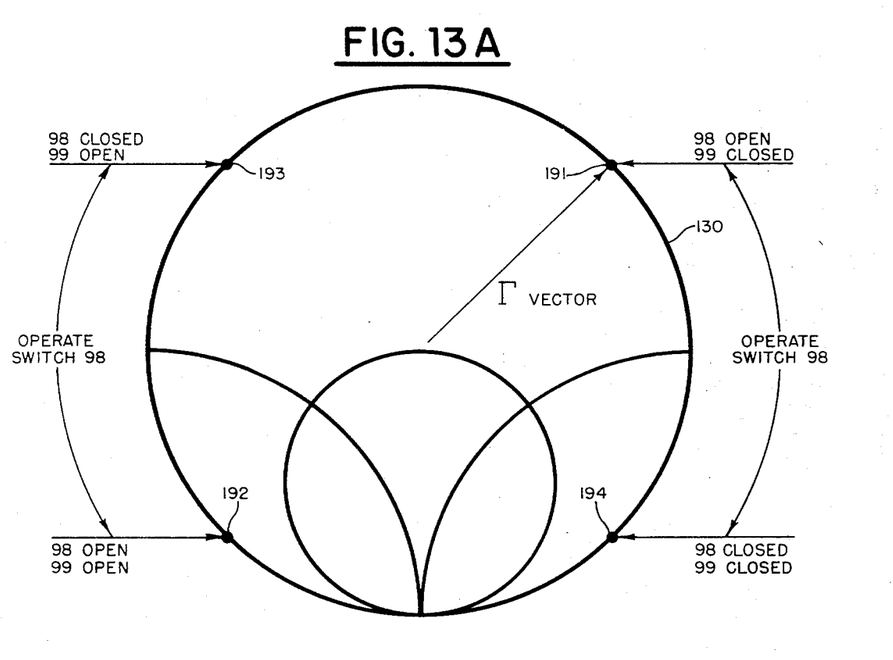
FIG. 13A is a Smith Chart illustration for explaining the behavior of the phase shifter of FIG. 13.

FIG. 13 shows schematically the operation of a phase shifter according to FIG. 9, with the aid of a Smith Chart in FIG. 13A. The first impedance assembly 95' comprises a capacitor 195 in shunt with the switch 98'. The second impedance assembly is made up of the distributed reactance of a section of the line 90', which is ³⁄₁₆λ long measured from the reflection point 97' and including the first impedance assembly 95'. The second switch 99' connects the second impedance assembly to the shorting member 91'. The magnitude of the capacitance of the capacitor is so chosen that $$\frac{1}{\omega C}=2Z_o$$

and $$jX=-j2Z_o=Z_4$$

With these parameters, the phase shifter has one of four phase states represented by points 191–194, respectively, on the circle 130 in FIG. 13A. Thus, it is shown that with only two switch devices, a phase shifter according to FIG. 9 can provide any one of four different reflection coefficient phase angles, equally spaced around the circle 130. If an inductor is substituted for the capacitor in FIG. 13, the reflection point 97' should be located λ/16 from the shorting member 91', and the magnitude of the inductance should be chosen so that $\omega L=2Z_o$.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

I claim:

1. An electric wave phase shifter for imparting to a wave reflected along a transmission path any one of four phase states spaced substantially at ninety electrical degree intervals, said phase shifter comprising a transmission path for incident and reflected waves, wave reflective means in said path including a first and second switchable impedance means, said first switchable impedance means having a first and a second impedance state and said second switchable impedance means having a third and a fourth impedance state, said first switchable impedance means providing substantially 180 electrical degrees of phase shift to said reflected wave when switched between its first and second impedance states and said second switchable impedance means providing substantially ninety electrical degrees of phase shift when switched from said third to said fourth impedance states, said phase shifts resulting from the switching of either of said switchable impedance means being independent of the impedance state of the other of said switchable impedance means.

2. An electric wave phase shifter according to claim 1 comprising said first switchable impedance means at a first location in said path, and means to control same to establish selectively one of a first and second impedance states therein, said second switchable impedance means at a second location in said path and means to control the same to establish one of a third and a fourth impedance states therein, said first and second locations being spaced apart a distance related to the wavelength in said path of a wave propagating therein, said means to control said first and second switchable impedance means being operative so as to establish selectively and alternatively any one of the following four combinations of said impedance states:

(a) said first state and said third state;
(b) said first state and said fourth state;
(c) said second and said third state; or
(d) said second state and said fourth state;

the existence of each of said combinations of states causing said wave to be reflected in said line with a unique amount of shift in phase.

3. An electric wave phase shifter according to claim 1 comprising, a section of transmission line having an input region for an incident wave, said first switchable impedance means coupled to a first switch region of said line remote from said input region, said second switchable impedance means coupled to a second switch region of said line nearer to said input region than said first switch region, said first switchable impedance means providing substantially 180 electrical degrees of phase change to said reflected wave when switched between said first and second impedance states, said second switchable means providing a change in reactance shunting said transmission line when switched between said third and fourth impedance states and said second switch region being so located in said line relative to said first switch region that said change in reactance provides substantially 90 electrical degrees of phase change to said reflected wave independent of the state of said first switchable means.

4. An electric wave phase shifter according to claim 3 including means to set said switchable impedance means selectively and alternatively in any one of the following four combinations of states:

(a) first and third,
(b) first and fourth,
(c) second and third, or
(d) second and fourth.

5. An electric wave phase shifter according to claim 3 in which said first switchable impedance means is connected across said line and said first state is substantially an open circuit and said second state is substantially a short circuit.

6. An electric wave phase shifter according to claim 5 in which said second switchable impedance means is connected across said line in series with a capacitor having a susceptance approximately $2Y_0$, said second switch region is substantially one-sixteenth electrical wavelength in said line from said first switch region, and said third state is substantially an open circuit and said fourth state is a circuit providing said susceptance across said line, where $Y_0$ is the characteristic admittance of said line.

7. An electric wave phase shifter according to claim 5 in which said second switchable impedance means is connected across said line in series with an inductor having a susceptance approximately $j2Y_0$, said second switch region is substantially $3/16$ electrical wavelength in said line from said first switch region, and said third state is substantially an open circuit and said fourth state is a circuit providing said susceptance across said line, where $Y_0$ is the characteristic admittance of said line.

8. In combination with an electric wave phase shifter according to claim 1, further phase shifter means for imparting to said wave any one of four additional phase states spaced substantially 22.5 electrical degrees apart, means coupling said further phase shifter means to said first-named electric wave phase shifter and switchable means to control said further phase shifter means to add to said wave a selected one of said additional phase states to a selected one of the phase states imparted thereto by said first-named phase shifter.

9. A combination according to claim 8 in which said further phase shifter means is coupled to receive as its input the wave reflected in said first-named electric wave phase shifter, and comprises a second transmission line having an input region for said wave and remote therefrom a third switch region, and switchable means at said third switch region to terminate said second transmission line selectively and alternatively with one of the following admittances:

$$jB = -j.3Y_0$$
$$jB = -j.1Y_0$$
$$jB = +j.1Y_0$$
$$jB = +j.3Y_0$$

10. A combination according to claim 9 in which a 3-port circulator is coupled between said input regions and a source of said wave.

11. A combination according to claim 8 in which said further phase shifter means is connected in said path between the signal input thereto and said first-named phase-shifter for adding one-half of the selected one of said additional phase states to said wave as incident upon said further phase shifter and one-half to said wave as reflected from said first-named phase shifter.

References Cited

UNITED STATES PATENTS 3,290,624   12/1966   Hines _______________ 333—31

HERMAN KARL SAALBACH, *Primary Examiner.*

PAUL L. GENSLER, *Assistant Examiner.*

U.S. Cl. X.R.

333—11, 97

UNITED STATES PATENT OFFICE
CERTIFICATE OF CORRECTION

Patent No. 3,423,699　　　　　　　　　　　　　　　　　　　　January 21, 1969

Marion E. Hines

It is certified that error appears in the above identified patent and that said Letters Patent are hereby corrected as shown below:

Column 6, line 43, "in ideal" should read -- an ideal --. Column 7, in the formula, about line 7, "open circuit" should read -- short circuit --; same formula, line 10, "short circuit" should read -- open circuit --; line 52, "admittance" should read -- admittances --. Column 8, line 71, "exempliled" should read -- exemplified --. Column 9, line 63, "rigth" should read -- right --.

Signed and sealed this 17th day of March 1970.

(SEAL)
Attest:

Edward M. Fletcher, Jr.　　　　　　　　　　　　　　WILLIAM E. SCHUYLER, JR.
Attesting Officer　　　　　　　　　　　　　　　　　　　Commissioner of Patents